(12) United States Patent
Guzman (10) Patent No.: US 10,507,910 B2
(45) Date of Patent: Dec. 17, 2019

(54) DUAL-INPUT MECHANICAL BYPASS LINKAGE APPARATUS AND METHODS

(71) Applicant: The Boeing Company, Chicago, IL (US)

(72) Inventor: Donald Guzman, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 15/441,427

(22) Filed: Feb. 24, 2017

(65) Prior Publication Data
US 2018/0244379 A1 Aug. 30, 2018

(51) Int. Cl.
| | | |
|---|---|---|
| *B64C 27/59* | (2006.01) | |
| *B64C 13/28* | (2006.01) | |
| *B64C 27/56* | (2006.01) | |
| *B64C 27/68* | (2006.01) | |
| *B64C 27/82* | (2006.01) | |
| *F16H 21/02* | (2006.01) | |

(52) U.S. Cl.
CPC .............. *B64C 27/59* (2013.01); *B64C 13/28* (2013.01); *B64C 27/56* (2013.01); *B64C 27/68* (2013.01); *B64C 27/82* (2013.01); *F16H 21/02* (2013.01)

(58) Field of Classification Search
CPC ......... B64C 27/59; B64C 13/28; B64C 27/56; B64C 27/68; B64C 27/82; F16H 21/02; G05D 1/0077
See application file for complete search history.

(56) References Cited

U.S. PATENT DOCUMENTS

| | | | | |
|---|---|---|---|---|
| 2,955,779 A | * | 10/1960 | Carter, Jr. ............... | B64C 27/82 244/17.21 |
| 3,220,317 A | | 11/1965 | Fuell | |
| 3,260,194 A | * | 7/1966 | Karlyn ............... | B41F 15/0872 101/124 |

(Continued)

FOREIGN PATENT DOCUMENTS

GB 985307 5/1962

OTHER PUBLICATIONS

European Patent Office, "Extended European Search Report," issued in connection with European Patent Application No. 17203719.4, dated Jan. 18, 2018, 6 pages.

*Primary Examiner* — Zakaria Elahmadi
(74) *Attorney, Agent, or Firm* — Hanley, Flight & Zimmerman, LLC (57) ABSTRACT

Dual-input mechanical bypass linkage apparatus and methods are disclosed. An example dual-input mechanical bypass linkage apparatus includes a primary link and a secondary link spaced apart from the primary link. The dual-input mechanical bypass linkage apparatus further includes a first extension link extending between the primary link and the secondary link. The first extension link is coupled to the primary link, to the secondary link and to a first input link. The first input link is coupled to a first actuator. The primary link is coupled to a second input link. The second input link is coupled to a second actuator. The dual-input mechanical bypass linkage apparatus further includes a second extension link spaced apart from the first extension link and extending between the primary link and the secondary link. The second extension link is coupled to the primary link, to the secondary link and to an output link.

20 Claims, 7 Drawing Sheets

(56) References Cited

U.S. PATENT DOCUMENTS

| | | | | |
|---|---|---|---|---|
| 3,614,401 A | * | 10/1971 | Lode | G05D 1/0077 244/194 |
| 3,718,989 A | * | 3/1973 | McKnight | G09B 9/08 353/85 |
| 3,948,467 A | * | 4/1976 | Krusius | B64F 3/00 244/116 |
| 4,112,824 A | | 9/1978 | Krause | |
| 4,488,612 A | * | 12/1984 | Patterson | B64F 1/22 180/14.1 |
| 4,946,329 A | * | 8/1990 | Krueger | B25J 7/00 359/896 |
| 5,091,892 A | * | 2/1992 | Secretan | G10K 11/008 310/337 |
| 5,510,991 A | * | 4/1996 | Pierson | G05D 1/0061 244/178 |
| 5,560,570 A | * | 10/1996 | Pierson | G05D 1/0061 244/194 |
| 5,749,540 A | * | 5/1998 | Arlton | B64O 27/82 244/17.13 |
| 5,797,564 A | * | 8/1998 | Cartmell | B64C 13/22 244/223 |
| 5,806,806 A | * | 9/1998 | Boehringer | G05D 1/0077 244/196 |
| 6,736,254 B1 | * | 5/2004 | Fortenbery | B65G 47/962 198/370.03 |
| 6,772,054 B1 | * | 8/2004 | Achache | B64C 13/18 244/227 |
| 7,252,266 B2 | * | 8/2007 | Tebon | B64C 25/00 244/110 E |
| 7,890,222 B1 | * | 2/2011 | Shultz | B64C 13/30 244/117 R |
| 2013/0248323 A1 | * | 9/2013 | Sotelo | B65G 17/12 198/370.04 |
| 2014/0217235 A1 | * | 8/2014 | Storm | B64C 27/615 244/99.3 |
| 2014/0271180 A1 | * | 9/2014 | Haldeman | F01D 7/00 416/1 |
| 2015/0014485 A1 | * | 1/2015 | Prud'Homme-Lacroix | B64C 1/22 244/137.4 |
| 2015/0246725 A1 | * | 9/2015 | Reilly | B64C 27/605 244/92 |
| 2016/0104331 A1 | * | 4/2016 | Huynh | B64C 13/16 701/4 |
| 2016/0144955 A1 | * | 5/2016 | Certain | B64C 11/30 416/147 |
| 2016/0195175 A1 | * | 7/2016 | Martyn | F16H 21/04 74/99 R |
| 2016/0221142 A1 | * | 8/2016 | Dall'Aglio | B24B 5/42 |
| 2016/0357215 A1 | * | 12/2016 | Kull | G05G 5/06 |
| 2017/0144747 A1 | * | 5/2017 | Bihel | B64D 31/04 |
| 2018/0009523 A1 | * | 1/2018 | Elliott | B64C 13/12 |
| 2018/0104077 A1 | * | 4/2018 | Cartledge | A61F 2/2418 |
| 2018/0273161 A1 | * | 9/2018 | Schlipf | B64C 9/14 |

\* cited by examiner

DUAL-INPUT MECHANICAL BYPASS LINKAGE APPARATUS AND METHODS

FIELD OF DISCLOSURE

This disclosure relates generally to mechanical linkages and, more specifically, to dual-input mechanical bypass linkage apparatus and methods.

BACKGROUND

Mechanical linkages couple flight control input devices of an aircraft to flight control output devices of the aircraft. For example, a first set of mechanical linkages may couple a collective lever to a main rotor of a helicopter, a second set of mechanical linkages may couple a cyclic stick to the main rotor of the helicopter, and a third set of mechanical linkages may couple anti-torque foot pedals to a tail rotor of the helicopter.

The aforementioned sets of mechanical linkages and their corresponding flight control input devices are typically implemented within the aircraft in a redundant manner. The redundancy is intended to ensure that one of the redundant sets of mechanical linkages and corresponding flight control input devices remains functional and/or operable in the event of a failure of the other one of the redundant sets of mechanical linkages and corresponding flight control input devices.

SUMMARY

Dual-input mechanical bypass linkage apparatus and methods are disclosed herein. In some examples, a dual-input mechanical bypass linkage apparatus is disclosed. In some disclosed examples, the dual-input mechanical bypass linkage apparatus comprises a primary link and a secondary link spaced apart from the primary link. In some disclosed examples, the dual-input mechanical bypass linkage apparatus further includes a first extension link extending between the primary link and the secondary link. In some disclosed examples, the first extension link is coupled to the primary link, to the secondary link and to a first input link. In some disclosed examples, the first input link is to be coupled to a first actuator. In some disclosed examples, the primary link is coupled to a second input link. In some disclosed examples, the second input link is to be coupled to a second actuator. In some disclosed examples, the dual-input mechanical bypass linkage apparatus further comprises a second extension link spaced apart from the first extension link and extending between the primary link and the secondary link. In some disclosed examples, the second extension link is coupled to the primary link, to the secondary link and to an output link.

In some disclosed examples, a dual-input mechanical bypass linkage apparatus comprises a primary link having a first end, a second end located opposite the first end, and a midpoint located between the first end and the second end. In some disclosed examples, the dual-input mechanical bypass linkage apparatus further comprises a secondary link having a first end and a second end located opposite the first end. In some disclosed examples, the secondary link is spaced apart from the primary link. In some disclosed examples, the dual-input mechanical bypass linkage apparatus further comprises a first extension link having a first end, a second end located opposite the first end, and a midpoint located between the first end and the second end. In some disclosed examples, the first extension link extends between the primary link and the secondary link. In some disclosed examples, the first end of the first extension link is rotatably coupled to the first end of the primary link, the second end of the first extension link is rotatably coupled to the first end of the secondary link, the midpoint of the first extension link is rotatably coupled to a first input link, the first input link is coupled to a first actuator, the midpoint of the primary link is rotatably coupled to a second input link, and the second input link is coupled to a second actuator. In some disclosed examples, the dual-input mechanical bypass linkage apparatus further comprises a second extension link having a first end, a second end located opposite the first end, and a midpoint located between the first end and the second end. In some disclosed examples, the second extension link is spaced apart from the first extension link and extends between the primary link and the secondary link. In some disclosed examples, the first end of the second extension link is rotatably coupled to the second end of the primary link, the second end of the second extension link is rotatably coupled to the second end of the secondary link, and the midpoint of the second extension link is rotatably coupled to an output link.

In some examples, a method for moving an output link of a dual-input mechanical bypass linkage apparatus is disclosed. In some disclosed examples, the method comprises receiving a first input force at a first input link of the dual-input mechanical bypass linkage apparatus. In some disclosed examples, the first input force is generated by a first actuator coupled to the first input link. In some disclosed examples, the method further comprises transferring the first input force from the first input link to a first extension link of the dual-input mechanical bypass linkage apparatus, from the first extension link to a secondary link of the dual-input mechanical bypass linkage apparatus, from the secondary link to a second extension link of the dual-input mechanical bypass linkage apparatus, and from the second extension link to the output link. In some disclosed examples, the first input link is coupled to the first extension link, the first extension link is coupled to the secondary link, the secondary link is coupled to the second extension link, and the second extension link is coupled to the output link. In some disclosed examples, the second extension link is spaced apart from the first extension link. In some disclosed examples, the method further comprises, when a second input link of the dual-input mechanical bypass linkage apparatus is not locked, receiving a second input force at the second input link. In some disclosed examples, the second input force is generated by a second actuator coupled to the second input link. In some disclosed examples, the method further comprises, when the second input link is not locked, transferring the second input force from the second input link to a primary link of the dual-input mechanical bypass linkage apparatus, from the primary link to the second extension link, and from the second extension link to the output link. In some disclosed examples, the second input link is coupled to the primary link, and the primary link is coupled to the second extension link. In some disclosed examples, the primary link is spaced apart from the secondary link.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Mechanical linkages couple flight control input devices of an aircraft to flight control output devices of the aircraft. For example, a first set of mechanical linkages may couple a collective lever to a main rotor of a helicopter, a second set of mechanical linkages may couple a cyclic stick to the main rotor of the helicopter, and a third set of mechanical linkages may couple anti-torque foot pedals to a tail rotor of the helicopter. The aforementioned sets of mechanical linkages and their corresponding flight control input devices are typically implemented within the aircraft in a redundant manner. The redundancy is intended to ensure that one of the redundant sets of mechanical linkages and corresponding flight control input devices remains functional and/or operable in the event of a failure of the other one of the redundant sets of mechanical linkages and corresponding flight control input devices.

The intended safety benefit that results from implementing redundant flight control systems in an aircraft is offset by several disadvantages that arise as a result of the redundancy. Such disadvantages include increasing the weight of the aircraft and increasing the cost of the aircraft. The dual-input mechanical bypass linkage apparatus and methods disclosed herein advantageously eliminate the need for redundant flight control systems, thereby decreasing the relative weight and the relative cost of an aircraft in which the disclosed dual-input mechanical bypass linkage apparatus and methods are implemented.

Figure 1:
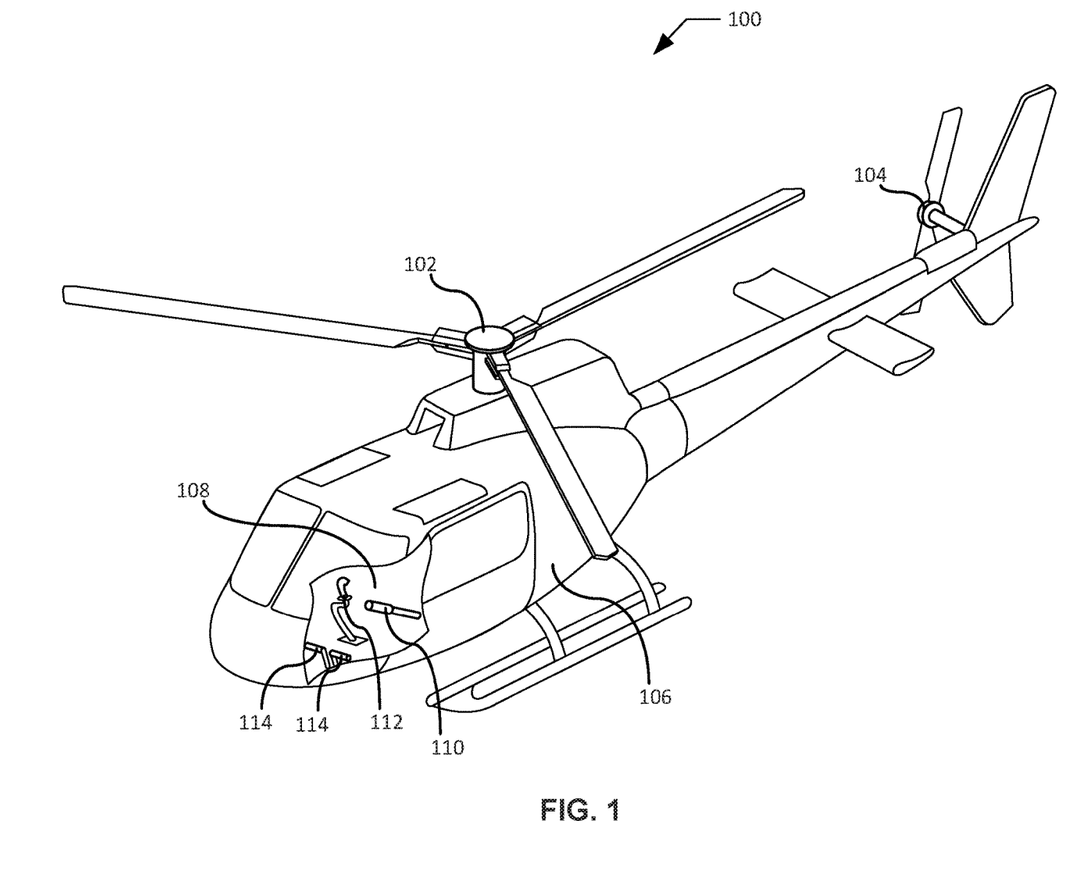
FIG. 1 illustrates an example aircraft in which an example dual-input mechanical bypass linkage apparatus may be implemented in accordance with the teachings of this disclosure.

FIG. 1 illustrates an example aircraft 100 in which an example dual-input mechanical bypass linkage apparatus may be implemented in accordance with the teachings of this disclosure. The aircraft 100 of FIG. 1 is a helicopter. The aircraft 100 includes an example main rotor 102, an example tail rotor 104, and an example fuselage 106 having an example cockpit 108. The cockpit 108 includes an example collective lever 110, an example cyclic stick 112, and example anti-torque foot pedals 114. The collective lever 110, the cyclic stick 112, and the anti-torque foot pedals 114 may be controlled and/or actuated by an individual (e.g., a pilot) positioned in the cockpit 108 of the aircraft 100.

In the illustrated example of FIG. 1, the collective lever 110, the cyclic stick 112, and the anti-torque foot pedals 114 constitute and/or form part of the flight controls for the aircraft 100. The collective lever 110 of FIG. 1 is coupled to the main rotor 102 of the aircraft 100 via one or more mechanical linkages generally located in the fuselage 106 of the aircraft 100. Actuation of the collective lever 110 controls the vertical position (e.g., the altitude) of the aircraft 100. The cyclic stick 112 of FIG. 1 is also coupled to the main rotor 102 of the aircraft 100 via one or more mechanical linkages generally located in the fuselage 106 of the aircraft 100. Actuation of the cyclic stick 112 controls the lateral and/or longitudinal position of the aircraft 100. The anti-torque foot pedals 114 of FIG. 1 are coupled to the tail rotor 104 of the aircraft 100 via one or more mechanical linkages generally located in the fuselage 106 of the aircraft 100. Actuation of the anti-torque foot pedals 114 controls the directional position of the aircraft 100. The example dual-input mechanical bypass linkage apparatus disclosed herein may be implemented in connection with one or more of the collective lever 110, the cyclic stick 112, and/or the anti-torque foot pedals 114 of the aircraft of FIG. 1.

For example, the dual-input mechanical bypass linkage apparatus described below in connection with FIGS. 2-5 may constitute and/or form part of the mechanical linkage(s) that couple the collective lever 110 of FIG. 1 to the main rotor 102 of the aircraft 100 of FIG. 1. In such an example, the collective lever 110 is a first actuator that provides (e.g., directly or indirectly) a first input (e.g., a first input force) to the dual-input mechanical bypass linkage apparatus. A second actuator (e.g., a motor) may provide (e.g., directly or indirectly) a second input (e.g., a second input force) to the dual-input mechanical bypass linkage apparatus to enable power-assisted (e.g., boosted) control of the main rotor 102 of the aircraft 100 via the collective lever 110. The disclosed dual-input mechanical bypass linkage apparatus provide for a mechanical bypass in the event of the failure of one of the two actuators. For example, in the event that the second actuator fails (e.g., the motor locks), the disclosed dual-input mechanical bypass linkage apparatus remain actuatable via the first actuator such that the failure of the second actuator may be bypassed and the collective lever 110 remains capable of controlling the main rotor 102 of the aircraft 100 of FIG. 1.

While the example of FIG. 1 described above is directed to an aircraft 100 in the form of a helicopter, the dual-input mechanical bypass linkage apparatus disclosed herein may be implemented in other types and/or forms of aircraft including, for example, manned and/or unmanned aircraft (e.g., airplanes, drones, etc.).

Figure 2:
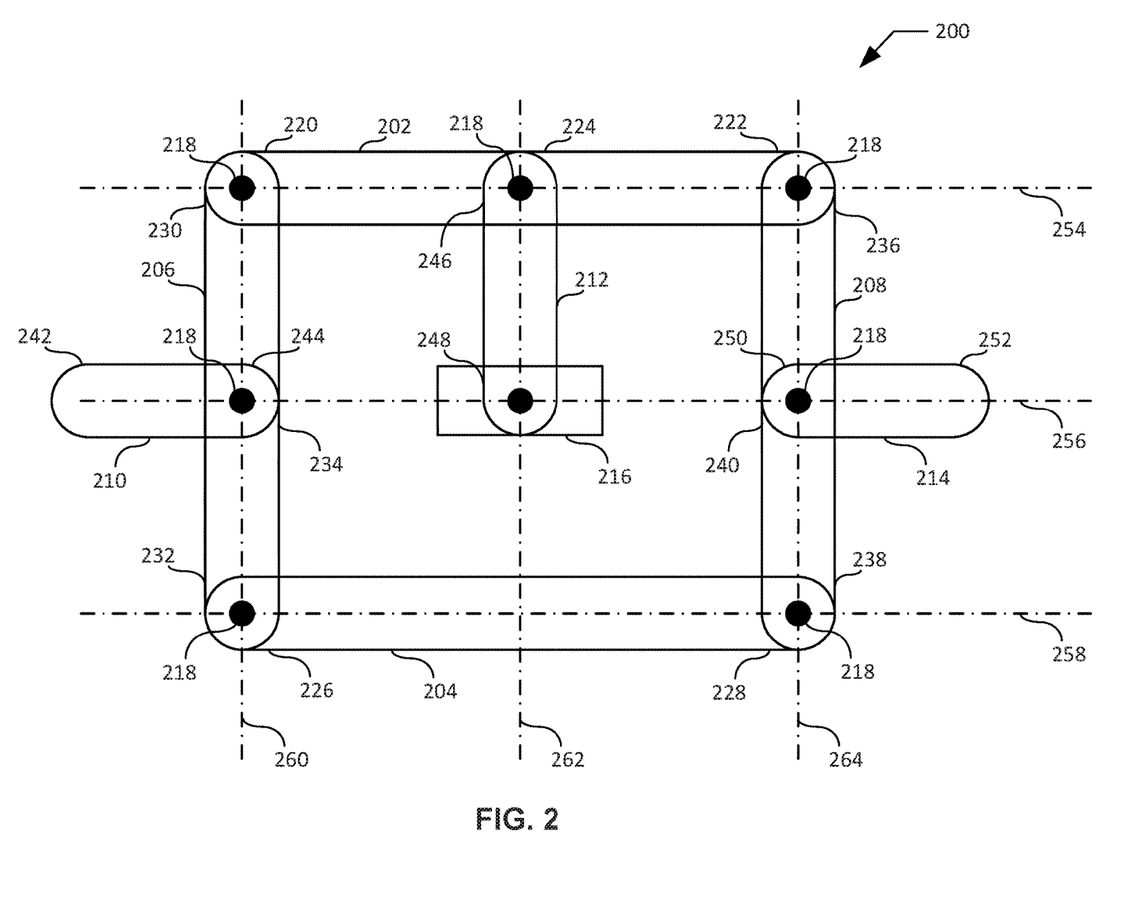
FIG. 2 is a side view illustrating an example dual-input mechanical bypass linkage apparatus in a first position.

FIG. 2 is a side view illustrating an example dual-input mechanical bypass linkage apparatus 200 in a first position. The dual-input mechanical bypass linkage apparatus 200 of FIG. 2 includes an example primary link 202, an example secondary link 204, an example first extension link 206, an example second extension link 208, an example first input link 210, an example second input link 212, an example output link 214, an example motor 216, and example fasteners 218. Any of the primary link 202, the secondary link 204, the first extension link 206, the second extension link 208, the first input link 210, the second input link 212 and/or the output link 214 may be implemented as one or more link(s), strut(s), bar(s), rod(s), shaft(s), plate(s), etc. The motor 216 of FIG. 2 may be implemented as an electromechanical motor. The motor 216 may alternatively be implemented as a different type of actuator such as, for example, a hydraulic actuator. Any of the fasteners 218 of FIG. 2 may be implemented as one or more screw(s), bolt(s), pin(s), rivet(s), etc. that enable two links to be movably coupled (e.g., rotatably coupled, slidably coupled, etc.) relative to one another.

The primary link 202 of FIG. 2 includes an example first end 220, an example second end 222 located opposite the first end 220, and an example midpoint 224 located between the first end 220 and the second end 222. The secondary link 204 of FIG. 2 includes an example first end 226, and an example second 228 end located opposite the first end 226. The first extension link 206 of FIG. 2 includes an example first end 230, an example second end 232 located opposite the first end 230, and an example midpoint 234 located between the first end 230 and the second end 232. The second extension link 208 of FIG. 2 includes an example first end 236, an example second end 238 located opposite the first end 236, and an example midpoint 240 located between the first end 236 and the second end 238. The first input link 210 of FIG. 2 includes an example first end 242, and an example second end 244 located opposite the first end 242. The second input link 212 of FIG. 2 includes an example first end 246, and an example second end 248 located opposite the first end 246. The output link 214 of FIG. 2 includes an example first end 250, and an example second end 252 located opposite the first end 250.

In the illustrated example of FIG. 2, the first end 220 of the primary link 202 is rotatably coupled to the first end 230 of the first extension link 206 via a first one of the fasteners 218. The second end 222 of the primary link 202 is rotatably coupled to the first end 236 of the second extension link 208 via a second one of the fasteners 218. The midpoint 224 of the primary link 202 is rotatably coupled to the first end 246 of the second input link 212 via a third one of the fasteners 218. In other examples, the couplings between the primary link 202 and respective ones of the first extension link 206, the second extension link 208, and the second input link 212 may be positioned at locations that differ from those specifically shown in FIG. 2. For example, the first end 246 of the second input link 212 may be coupled to the primary link 202 at a location that is more proximate the first end 220 of the primary link 202 relative to the location at which the second input link 212 is shown in FIG. 2 as being coupled to the primary link 202.

As further shown in the illustrated example of FIG. 2, the first end 226 of the secondary link 204 is rotatably coupled to the second end 232 of the first extension link 206 via a fourth one of the fasteners 218. The second end 228 of the secondary link 204 is rotatably coupled to the second end 238 of the second extension link 208 via a fifth one of the fasteners 218. In other examples, the couplings between the secondary link 204 and respective ones of the first extension link 206 and the second extension link 208 may be positioned at locations that differ from those specifically shown in FIG. 2.

As further shown in the illustrated example of FIG. 2, the second end 244 of the first input link 210 is rotatably coupled to the midpoint 234 of the first extension link 206 via a sixth one of the fasteners 218. The first end 242 of the first input link 210 is coupled (e.g., directly or indirectly) to a first actuator (not shown in FIG. 2) such as, for example, the collective lever 110, the cyclic stick 112, or the anti-torque foot pedals 114 of the aircraft 100 of FIG. 1. In other examples, the coupling between the first input link 210 and the first extension link 206 may be positioned at a location that differs from that specifically shown in FIG. 2.

As further shown in FIG. 2, the second end 248 of the second input link 212 is rotatably coupled to a second actuator such as, for example, the motor 216 of FIG. 2. In other examples, the couplings between the second input link 212 and respective ones of the primary link 202 and the motor 216 may be positioned at locations that differ from those specifically shown in FIG. 2.

As further shown in the illustrated example of FIG. 2, the first end 250 of the output link 214 is rotatably coupled to the midpoint 240 of the second extension link 208 via a seventh one of the fasteners 218. The second end 252 of the output link 214 may be coupled (e.g., directly or indirectly) to the main rotor 102 or the tail rotor 104 of the aircraft 100 of FIG. 1. In other examples, the coupling between the output link 214 and the second extension link 208 may be positioned at a location that differs from that specifically shown in FIG. 2.

In the illustrated example of FIG. 2, the primary link 202 is aligned with a first example horizontal reference line 254, the first input link 210 and the output link 214 are aligned with a second example horizontal reference line 256, and the secondary link 204 is aligned with a third example horizontal reference line 258. The first extension link 206 is aligned with a first example vertical reference line 260, the second input link 212 is aligned with a second example vertical reference line 262, and the second extension link 208 is aligned with a third example vertical reference line 264. The first, second and third horizontal reference lines 254, 256, 258 and the first, second and third vertical reference lines 260, 262, 264 of FIG. 2 define the first position of the dual-input mechanical bypass linkage apparatus 200 of FIG. 2. When the dual-input mechanical bypass linkage apparatus 200 is positioned in the first position shown in FIG. 2, the primary link 202, the secondary link 204, the first extension link 206 and the second extension link 208 collectively form a generally rectangular shape.

In some examples, the first input link 210 and/or the first actuator (e.g., the collective lever 110, the cyclic stick 112, or the anti-torque foot pedals 114 of the aircraft 100 of FIG. 1) to which the first input link 210 of FIG. 2 is coupled may be operatively coupled to (e.g., in electrical and/or electro-mechanical communication with) the second actuator (e.g., the motor 216 of FIG. 2) of the dual-input mechanical bypass linkage apparatus 200 of FIG. 2. In such examples, the operative coupling may enable the second actuator to track and/or monitor the movement of the first actuator, and to utilize the tracked and/or monitored movement of the first actuator as a basis by which to determine a suitable amount of force to be generated by the second actuator of the dual-input mechanical bypass linkage apparatus 200. In some such examples, the amount of force to be generated by the second actuator coupled to the dual-input mechanical bypass linkage apparatus 200 balances and/or equals the amount of force generated by the first actuator coupled to the dual-input mechanical bypass linkage apparatus 200.

Figure 3:
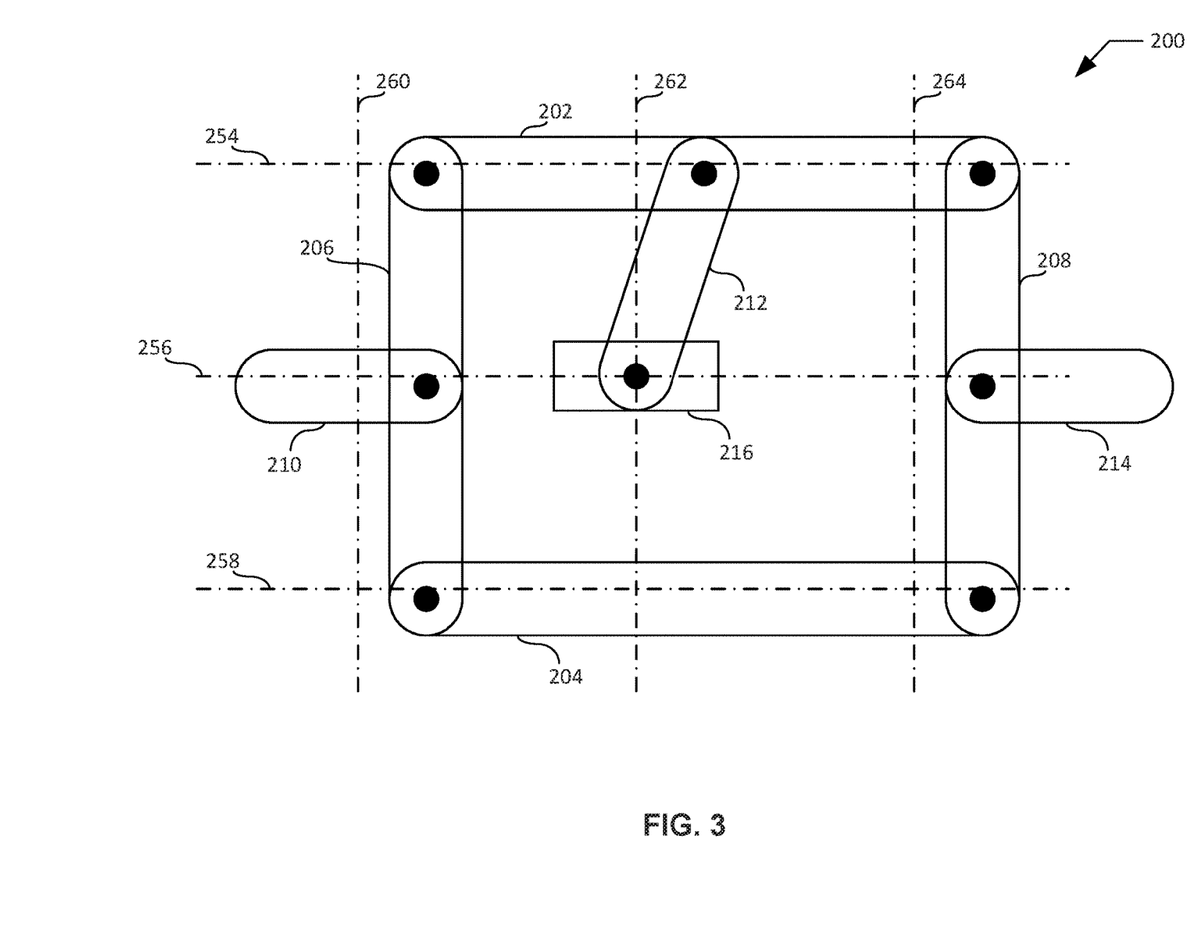
FIG. 3 is a side view illustrating the example dual-input mechanical bypass linkage apparatus of FIG. 2 in a second position.

FIG. 3 is a side view illustrating the example dual-input mechanical bypass linkage apparatus 200 of FIG. 2 in a second position. The dual-input mechanical bypass linkage apparatus 200 may be moved from the first position shown in FIG. 2 to the second position shown in FIG. 3 based on input forces (e.g., balanced input forces) generated by and/or at respective ones of a first actuator and a second actuator. For example, a first input force generated by and/or at a first actuator (e.g., the collective lever 110 of the aircraft 100 of FIG. 1) may be transferred to the first extension link 206 via the first input link 210 of FIGS. 2 and 3. The first input force may be further transferred from the first extension link 206 to the second extension link 208 via the primary link 202 and/or via the secondary link 204. A second input force (e.g., a force that balances the first input force or, alternatively, that is balanced by the first input force) generated by and/or at a second actuator (e.g., the motor 216 of FIGS. 2 and 3) may be transferred to the primary link 202 via the second input link 212 of FIGS. 2 and 3. The second input force may be further transferred from the primary link 202 to the second extension link 208. The first and/or second input force(s) transferred to the second extension link 208 may be further transferred to the output link 214. In some examples, the second input force is an electromechanically-generated input force that assists, amplifies, and/or boosts a manually-generated first input force. In the illustrated example of FIG. 3, the motor 216 has generated a force that has caused the second input link 212 as shown in FIG. 3 to rotate approximately twenty degrees relative to the position of the second input link 212 as shown in FIG. 2.

In the illustrated example of FIG. 3 described above, the dual input forces respectively generated by and/or at the first actuator and the second actuator have caused the dual-input mechanical bypass linkage apparatus 200 to move from the first position shown FIG. 2 to the second position shown in FIG. 3. The first, second and third horizontal reference lines 254, 256, 258 and the first, second and third vertical reference lines 260, 262, 264 of FIG. 2 are reproduced in FIG. 3 to illustrate the corresponding change in position of the dual-input mechanical bypass linkage apparatus 200 (e.g., movement of the dual-input mechanical bypass linkage apparatus 200 from the first position of FIG. 2 to the second position of FIG. 3).

Figure 4:
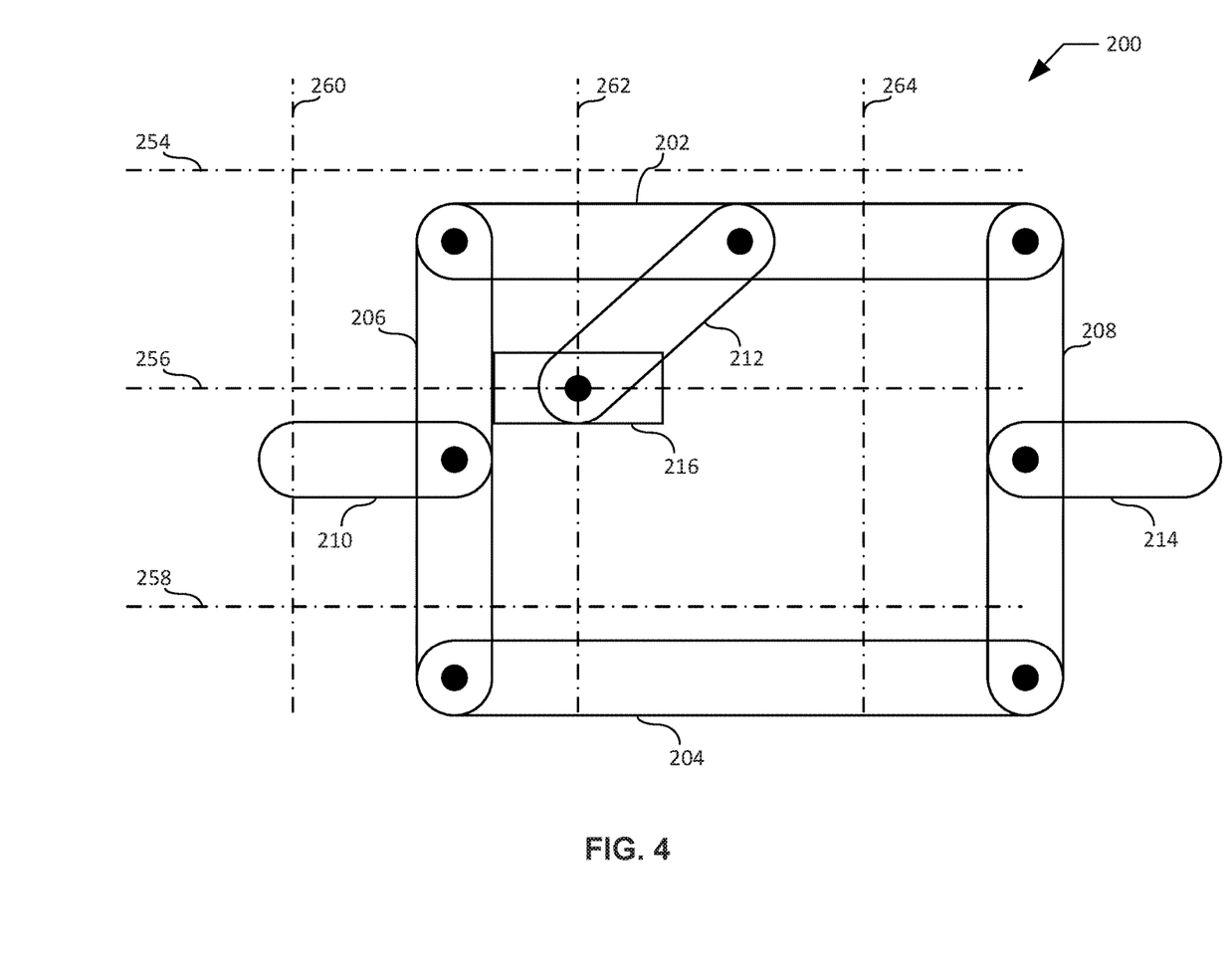
FIG. 4 is a side view illustrating the example dual-input mechanical bypass linkage apparatus of FIG. 2 in a third position.

FIG. 4 is a side view illustrating the example dual-input mechanical bypass linkage apparatus 200 of FIG. 2 in a third position. The dual-input mechanical bypass linkage apparatus 200 may be moved from the second position shown in FIG. 3 to the third position shown in FIG. 4 based on input forces (e.g., balanced input forces) generated by and/or at respective ones of a first actuator and a second actuator. For example, a first input force generated by and/or at a first actuator (e.g., the collective lever 110 of the aircraft 100 of FIG. 1) may be transferred to the first extension link 206 via the first input link 210 of FIGS. 2-4. The first input force may be further transferred from the first extension link 206 to the second extension link 208 via the primary link 202 and/or via the secondary link 204. A second input force (e.g., a force that balances the first input force or, alternatively, that is balanced by the first input force) generated by and/or at a second actuator (e.g., the motor 216 of FIGS. 2-4) may be transferred to the primary link 202 via the second input link 212 of FIGS. 2-4. The second input force may be further transferred from the primary link 202 to the second extension link 208. The first and/or second input forces) transferred to the second extension link 208 may be further transferred to the output link 214. In some examples, the second input force is an electromechanically-generated input force that assists, amplifies, and/or boosts a manually-generated first input force. In the illustrated example of FIG. 4, the motor 216 has generated a force that has caused the second input link 212 as shown in FIG. 4 to rotate approximately twenty-five degrees relative to the position of the second input link 212 as shown in FIG. 3 (e.g., forty-five degrees relative to the position of the second input link 212 as shown in FIG. 2).

In the illustrated example of FIG. 4 described above, the dual input forces respectively generated by and/or at the first actuator and the second actuator have caused the dual-input mechanical bypass linkage apparatus 200 to move from the second position shown in FIG. 3 to the third position shown in FIG. 4. The first, second and third horizontal reference lines 254, 256, 258 and the first, second and third vertical reference lines 260, 262, 264 of FIGS. 2 and 3 are reproduced in FIG. 4 to illustrate the corresponding change in position of the dual-input mechanical bypass linkage apparatus 200 (e.g., movement of the dual-input mechanical bypass linkage apparatus 200 from the first position of FIG. 2 and/or the second position of FIG. 3 to the third position of FIG. 4).

Figure 5:
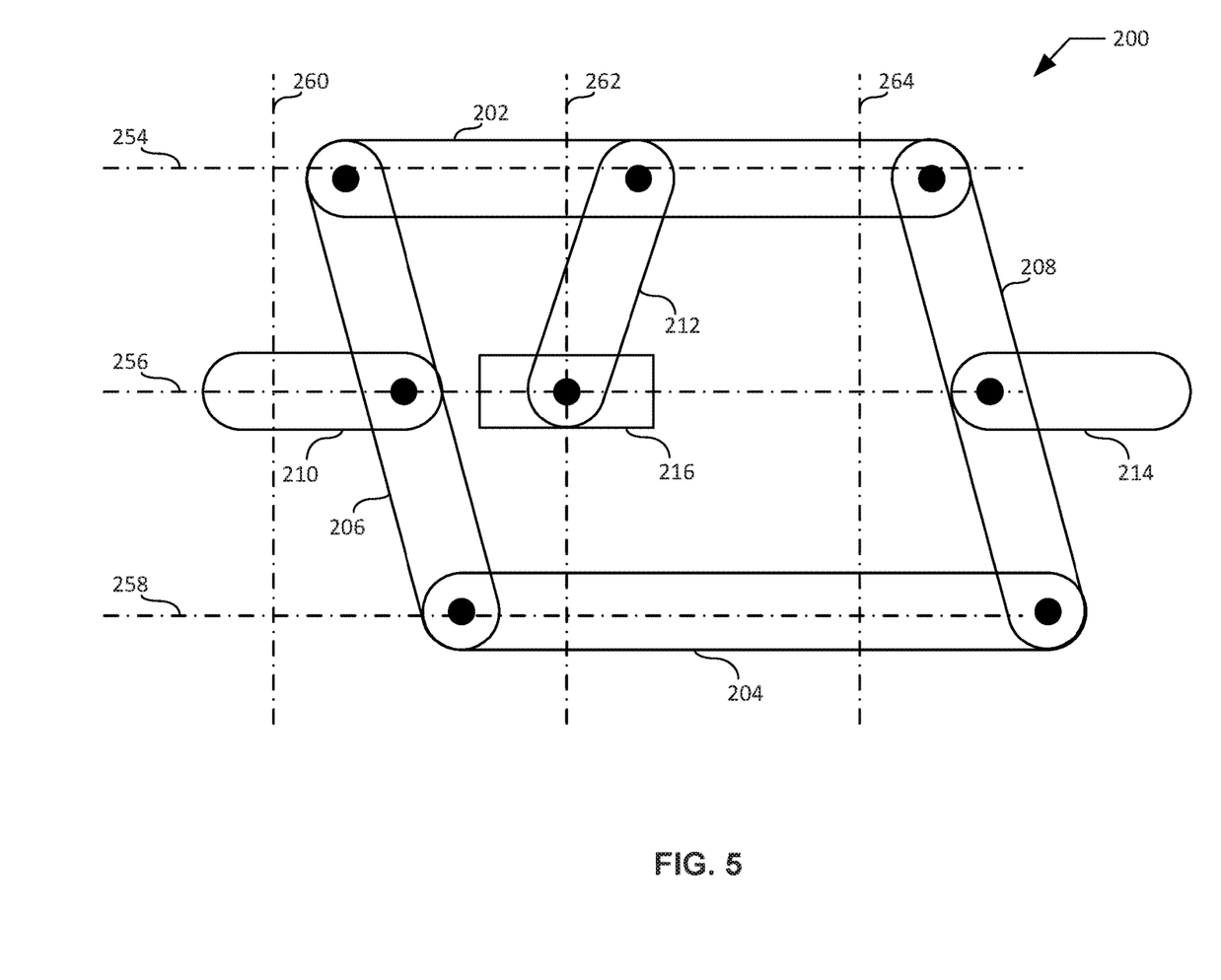
FIG. 5 is a side view illustrating the example dual-input mechanical bypass linkage apparatus of FIG. 2 in a fourth position.

FIG. 5 is a side view illustrating the example dual-input mechanical bypass linkage apparatus 200 of FIG. 2 in a fourth position. In the illustrated example of FIG. 5, the motor 216 has failed, thereby resulting in the second input link 212 being locked in the position shown in FIGS. 3 and 5 (e.g., the second input link 212 being rotated approximately twenty degrees relative to the position of the second input link 212 as shown in FIG. 2). Even though the second input link 212 of FIG. 5 is locked, the dual-input mechanical bypass linkage apparatus 200 may still be moved (e.g., via a mechanical bypass) from the second position shown in FIG. 3 to the fourth position shown in FIG. 5 based on an input force generated by and/or at a first actuator. For example, when the second input link 212 is locked in the position shown in FIGS. 3 and 5, an input force generated by and/or at a first actuator (e.g., the collective lever 110 of the aircraft 100 of FIG. 1) may be transferred to the first extension link 206 via the first input link 210 of FIGS. 2, 3 and 5. The input force may be further transferred from the first extension link 206 to the second extension link 208 via the secondary link 204, and from the second extension link 208 to the output link 214.

In the illustrated example of FIG. 5 described above, the input force generated by and/or at the first actuator has caused the dual-input mechanical bypass linkage apparatus 200 to move from the second position shown in FIG. 3 to the fourth position shown in FIG. 5 even though the second input link 212 of the dual-input mechanical bypass linkage apparatus 200 is locked. The first, second and third horizontal reference lines 254, 256, 258 and the first, second and third vertical reference lines 260, 262, 264 of FIGS. 2 and 3 are reproduced in FIG. 5 to illustrate the corresponding change in position of the dual-input mechanical bypass linkage apparatus 200 (e.g., movement of the dual-input mechanical bypass linkage apparatus 200 from the first position of FIG. 2 and/or the second position of FIG. 3 to the fourth position of FIG. 5).

Figure 6:
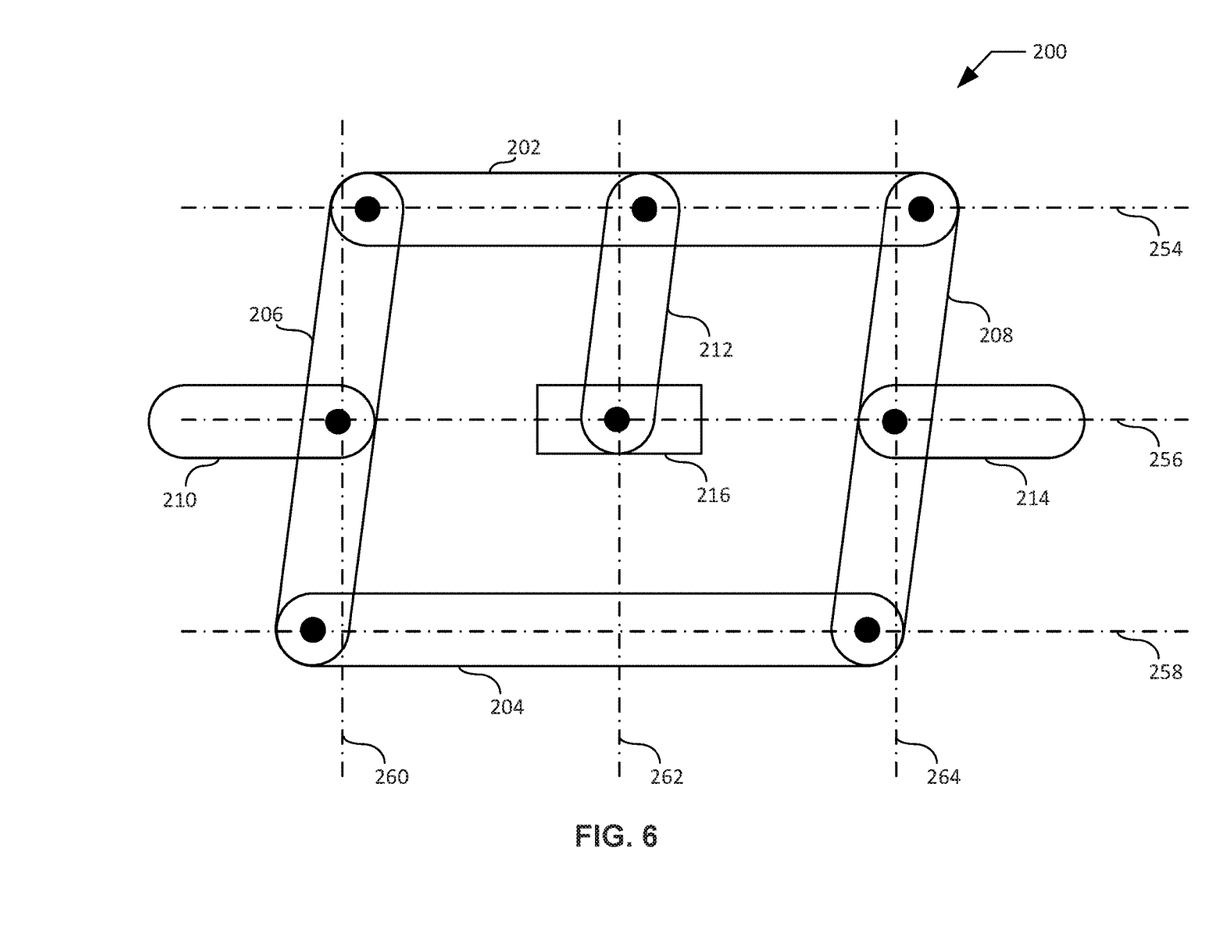
FIG. 6 is a side view illustrating the example dual-input mechanical bypass linkage apparatus of FIG. 2 in a fifth position.

FIG. 6 is a side view illustrating the example dual-input mechanical bypass linkage apparatus 200 of FIG. 2 in a fifth position. In the illustrated example of FIG. 6, the dual-input mechanical bypass linkage apparatus 200 is implemented as and/or in conjunction with a stability augmentation mechanism to enable an electro-mechanically powered and/or controlled second actuator (e.g., the motor 216 of FIGS. and 6) coupled to the dual-input mechanical bypass linkage apparatus 200 to generate a stabilization input force to control the position of the output link 214 of the dual-input mechanical bypass linkage apparatus 200 in the absence of, and/or without the application of, an input force generated by and/or at a manually-powered first actuator (e.g., the collective lever 110 of the aircraft 100 of FIG. 1) coupled to the dual-input mechanical bypass linkage apparatus 200. For example, a stabilization input force generated by and/or at the motor 216 of FIGS. 2 and 6 may be transferred to the primary link 202 via the second input link 212 of FIGS. 2 and 6. The stabilization input force may be further transferred from the primary link 202 to the second extension link 208, and from the second extension link 208 to the output link 214 of FIGS. 2 and 6. In some examples, the stabilization input force may stabilize the vertical, longitudinal, lateral and/or directional position(s) of the aircraft 100 of FIG. 1 during flight. In the illustrated example of FIG. 6, the motor 216 has generated a stabilization input force that has caused the second input link 212 as shown in FIG. 6 to rotate approximately five degrees relative to the position of the second input link 212 as shown in FIG. 2.

In the illustrated example of FIG. 6 described above, the stabilization input force generated by and/or at the second actuator has caused the dual-input mechanical bypass linkage apparatus 200 to move from the first position shown in FIG. 2 to the fifth position shown in FIG. 6. The first, second and third horizontal reference lines 254, 256, 258 and the first, second and third vertical reference lines 260, 262, 264 of FIG. 2 are reproduced in FIG. 6 to illustrate the corresponding change in position of the dual-input mechanical bypass linkage apparatus 200 (e.g., movement of the dual-input mechanical bypass linkage apparatus 200 from the first position of FIG. 2 to the fifth position of FIG. 6).

Figure 7:
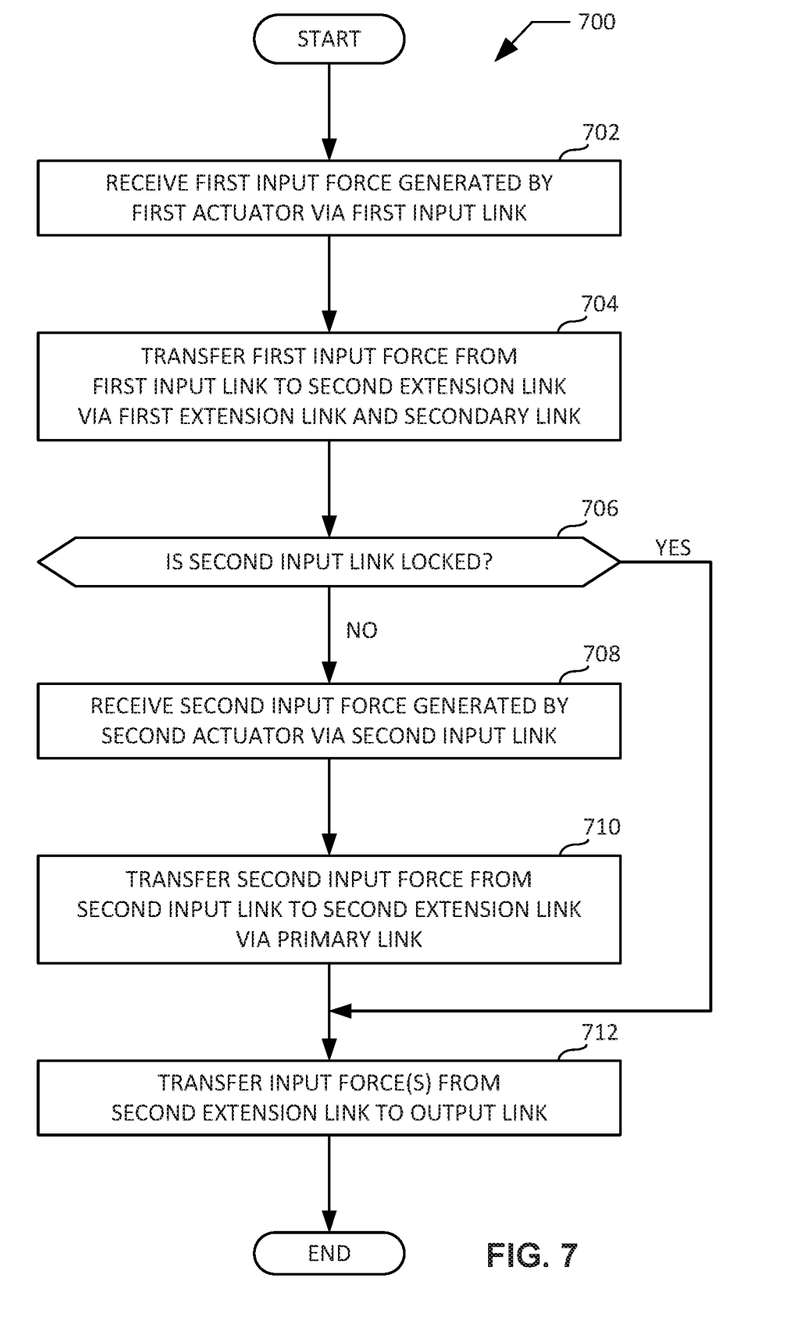
FIG. 7 is a flowchart representative of an example method for implementing the example dual-input mechanical bypass linkage apparatus of FIGS. 2-5 to move the example output link of the example dual-input mechanical bypass linkage apparatus.

FIG. 7 is a flowchart representative of an example method 700 for implementing the example dual-input mechanical bypass linkage apparatus 200 of FIGS. 2-5 to move the example output link 214 of the example dual-input mechanical bypass linkage apparatus 200. The method 700 of FIG. 7 begins with receiving a first input force generated by and/or at a first actuator via the first input link 210 of the dual-input mechanical bypass linkage apparatus 200 (block 702). For example, the first input link 210 of FIG. 2 may receive a first input force generated by and/or at a first actuator (e.g., the collective lever 110, the cyclic stick 112, or the anti-torque foot pedals 114 of the aircraft 100 of FIG. 1) coupled to the first input link 210 and/or, more generally, to the dual-input mechanical bypass linkage apparatus 200.

The method 700 of FIG. 7 includes transferring the first input force from the first input link 210 to the second extension link 208 via the first extension link 206 and the secondary link 204 of the dual-input mechanical bypass linkage apparatus 200 (block 704). For example, the first input force received at the first input link 210 may be transferred from the first input link 210 to the first extension link 206 of FIG. 2, from the first extension link 206 to the secondary link 204 of FIG. 2, and from the secondary link 204 to the second extension link 208 of the dual-input mechanical bypass linkage apparatus 200 of FIG. 2.

The method 700 of FIG. 7 includes determining whether the second input link 212 of the dual-input mechanical bypass linkage apparatus 200 is locked (block 706). For example, if a second actuator (e.g., the motor 216 of FIG. 2) coupled to the second input link 212 of FIG. 2 fails, the failure of the second actuator may cause the second input link 212 to lock. If the second input link 212 of the dual-input mechanical bypass linkage apparatus 200 is not locked, the dual-input mechanical bypass linkage apparatus 200 proceeds to operate as described in connection with blocks 708, 710 and 712 below. If the second input link 212 of the dual-input mechanical bypass linkage apparatus 200 is locked, the dual-input mechanical bypass linkage apparatus 200 bypasses blocks 708 and 710 of the example method 700 of FIG. 7 and proceeds to operate as described in connection with block 712 below.

The method 700 of FIG. 7 includes receiving a second input force generated by and/or at a second actuator via the second input link 212 of the dual-input mechanical bypass linkage apparatus 200 (block 708). For example, the second input link 212 of FIG. 2 may receive a second input force generated by d/or at a second actuator (e.g., the motor 216 of FIG. 2) coupled to the second input link 212 and/or, more generally, to the dual-input mechanical bypass linkage apparatus 200. In some examples, the second input force is an electromechanically-generated input force that assists, amplifies, and/or boosts a manually-generated first input force. In some examples, the first input link 210 and/or the first actuator to which the first input link 210 of FIG. 2 is coupled may be operatively coupled to (e.g., in electrical and/or electro-mechanical communication with) the second actuator of the dual-input mechanical bypass linkage apparatus 200 of FIG. 2. In such examples, the operative coupling may enable the second actuator to track and/or monitor the movement of the first actuator, and to utilize the tracked and/or monitored movement of the first actuator as a basis by which to determine a suitable amount of force to be generated by the second actuator of the dual-input mechanical bypass linkage apparatus 200. In some such examples, the amount of force to be generated by the second actuator coupled to the dual-input mechanical bypass linkage apparatus 200 balances and/or equals the amount of force generated by the first actuator coupled to the dual-input mechanical bypass linkage apparatus 200.

The method 700 of FIG. 7 includes transferring the second input force from the second input link 212 to the second extension link 208 via the primary link 202 of the dual-input mechanical bypass linkage apparatus 200 (block 710). For example, when the second actuator (e.g., the motor 216 of FIG. 2) is operable and the second input link 212 of FIG. 2 is not locked, the second input force received at the second input link 212 may be transferred via the primary link 202 to the second extension link 208 of the dual-input mechanical bypass linkage apparatus 200 of FIG. 2.

The method 700 of FIG. 7 includes transferring the input force(s) from the second extension link 208 to the output link 214 of the dual-input mechanical bypass linkage apparatus 200 of FIG. 2 (block 712). For example, the first input force transferred to the second extension link 208 of FIG. 2 from the secondary link 204 of FIG. 2, and/or the second input force transferred to the second extension link 208 of FIG. 2 from the primary link 202 of FIG. 2 may respectively and/or collectively be transferred from the second extension link 208 of FIG. 2 to the output link 214 of the dual-input mechanical bypass linkage apparatus 200 of FIG. 2. Following block 712, the example method 700 of FIG. 7 ends.

From the foregoing, it will be appreciated that the disclosed dual-input mechanical bypass linkage apparatus and methods advantageously eliminate the need for redundant flight control systems, thereby decreasing the relative weight and the relative cost of an aircraft in which the disclosed dual-input mechanical bypass linkage apparatus and methods are implemented.

In some examples, a dual-input mechanical bypass linkage apparatus is disclosed. In some disclosed examples, the dual-input mechanical bypass linkage apparatus comprises a primary link and a secondary link spaced apart from the primary link. In some disclosed examples, the dual-input mechanical bypass linkage apparatus further includes a first extension link extending between the primary link and the secondary link. In some disclosed examples, the first extension link is coupled to the primary link, to the secondary link and to a first input link. In some disclosed examples, the first input link is to be coupled to a first actuator. In some disclosed examples, the primary link is coupled to a second input link. In some disclosed examples, the second input link is to be coupled to a second actuator. In some disclosed examples, the dual-input mechanical bypass linkage apparatus further comprises a second extension link spaced apart from the first extension link and extending between the primary link and the secondary link. In some disclosed examples, the second extension link is coupled to the primary link, to the secondary link and to an output link.

In some disclosed examples, the first extension link is rotatably coupled to the primary link, rotatably coupled to the secondary link, and rotatably coupled to the first input link. In some disclosed examples, the primary link is rotatably coupled to the second input link. In some disclosed examples, the second extension link is rotatably coupled to the primary link, rotatably coupled to the secondary link, and rotatably coupled to the output link.

In some disclosed examples, dual-input mechanical bypass linkage apparatus further comprises the first actuator and the second actuator. In some disclosed examples, the first actuator is manually powered and the second actuator is electromechanically powered. In some disclosed examples, the second actuator is operatively coupled to the first actuator. In some disclosed examples, the second actuator is a motor. In some disclosed examples, the first actuator is a collective lever, a cyclic stick, or a foot pedal of a helicopter. In some disclosed examples, the output link is coupled to a main rotor or a tail rotor of the helicopter.

In some disclosed examples, a first input force to be generated by the first actuator and to be received at the first input link is to be transferred from the first input link to the first extension link, from the first extension link to the secondary link, from the secondary link to the second extension link, and from the second extension link to the output link. In some disclosed examples, a second input force to be generated by the second actuator and to be received at the second input link is to be transferred from the second input link to the primary link, from the primary link to the second extension link, and from the second extension link to the output link. In some disclosed examples, the second input force is to boost the first input force. In some disclosed examples, the second input force is to be balanced with the first input force.

In some disclosed examples, the first input link, the first extension link, the secondary link, and the second extension link are to provide a mechanical bypass to move the output link when the second actuator fails. In some disclosed examples, the first input link, the first extension link, the secondary link, and the second extension link are to provide a mechanical bypass to move the output link when the second input link is locked.

In some disclosed examples, the second actuator is to generate a stabilization input force without the first input force being generated by the first actuator. In some disclosed examples, the stabilization input force is to be received at the second input link. In some disclosed examples, the stabilization input force is to be transferred from the second input link to the primary link, from the primary link to the second extension link, and from the second extension link to the output link.

In some disclosed examples, a dual-input mechanical bypass linkage apparatus comprises a primary link having a first end, a second end located opposite the first end, and a midpoint located between the first end and the second end. In some disclosed examples, the dual-input mechanical bypass linkage apparatus further comprises a secondary link having a first end and a second end located opposite the first end. In some disclosed examples, the secondary link is spaced apart from the primary link. In some disclosed examples, the dual-input mechanical bypass linkage apparatus further comprises a first extension link having a first end, a second end located opposite the first end, and a midpoint located between the first end and the second end. In some disclosed examples, the first extension link extends between the primary link and the secondary link. In some disclosed examples, the first end of the first extension link is rotatably coupled to the first end of the primary link, the second end of the first extension link is rotatably coupled to the first end of the secondary link, the midpoint of the first extension link is rotatably coupled to a first input link, the first input link is coupled to a first actuator, the midpoint of the primary link is rotatably coupled to a second input link, and the second input link is coupled to a second actuator. In some disclosed examples, the dual-input mechanical bypass linkage apparatus further comprises a second extension link having a first end, a second end located opposite the first end, and a midpoint located between the first end and the second end. In some disclosed examples, the second extension link is spaced apart from the first extension link and extends between the primary link and the secondary link. In some disclosed examples, the first end of the second extension link is rotatably coupled to the second end of the primary link, the second end of the second extension link is rotatably coupled to the second end of the secondary link, and the midpoint of the second extension link is rotatably coupled to an output link.

In some disclosed examples, a first input force to be generated by the first actuator and to be received at the first input link is to be transferred from the first input link to the first extension link, from the first extension link to the secondary link, from the secondary link to the second extension link, and from the second extension link to the output link. In some disclosed examples, a second input force to be generated by the second actuator and to be received at the second input link is to be transferred from the second input link to the primary link, from the primary link to the second extension link, and from the second extension link to the output link. In some disclosed examples, the first input link, the first extension link, the secondary link, and the second extension link are to provide a mechanical bypass to move the output link when the second input link is locked.

In some examples, a method for moving an output link of a dual-input mechanical bypass linkage apparatus is disclosed. In some disclosed examples, the method comprises receiving a first input force at a first input link of the dual-input mechanical bypass linkage apparatus. In some disclosed examples, the first input force is generated by a first actuator coupled to the first input link. In some disclosed examples, the method further comprises transferring the first input force from the first input link to a first extension link of the dual-input mechanical bypass linkage apparatus, from the first extension link to a secondary link of the dual-input mechanical bypass linkage apparatus, from the secondary link to a second extension link of the dual-input mechanical bypass linkage apparatus, and from the second extension link to the output link. In some disclosed examples, the first input link is coupled to the first extension link, the first extension link is coupled to the secondary link, the secondary link is coupled to the second extension link, and the second extension link is coupled to the output link. In some disclosed examples, the second extension link is spaced apart from the first extension link.

In some disclosed examples, the method further comprises, when a second input link of the dual-input mechanical bypass linkage apparatus is not locked, receiving a second input force at the second input link. In some disclosed examples, the second input force is generated by a second actuator coupled to the second input link. In some disclosed examples, the method further comprises, when the second input link is not locked, transferring the second input force from the second input link to a primary link of the dual-input mechanical bypass linkage apparatus, from the primary link to the second extension link, and from the second extension link to the output link. In some disclosed examples, the second input link is coupled to the primary link, and the primary link is coupled to the second extension link. In some disclosed examples, the primary link is spaced apart from the secondary link.

In some disclosed examples of the method, the first actuator is to be manually powered, the second actuator is to be electromechanically powered, and the second input force is to boost the first input force.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A dual-input mechanical bypass linkage apparatus, comprising:
    a first actuator configured to generate a first input force;
    a second actuator configured to generate a second input force;
    a primary link movable in response to the second input force;
    a secondary link movable in response to the first input force, the secondary link spaced apart from the primary link;
    a first extension link spaced apart from the first actuator and extending between the primary link and the secondary link, the first extension link coupled to the primary link, to the secondary link and to a first input link, the first input link coupled to and extending between the first actuator and the first extension link, the primary link coupled to a second input link, the second input link coupled to and extending between the second actuator and the primary link; and
    a second extension link spaced apart from the first extension link and extending between the primary link and the secondary link, the second extension link coupled to the primary link, to the secondary link and to an output link.

2. The dual-input mechanical bypass linkage apparatus of claim 1, wherein the first extension link is rotatably coupled to the primary link, rotatably coupled to the secondary link, and rotatably coupled to the first input link, the primary link is rotatably coupled to the second input link, and the second extension link is rotatably coupled to the primary link, rotatably coupled to the secondary link, and rotatably coupled to the output link.

3. The dual-input mechanical bypass linkage apparatus of claim 1, wherein the first actuator is manually powered and the second actuator is electromechanically powered.

4. The dual-input mechanical bypass linkage apparatus of claim 3, wherein the second actuator is in electrical communication with the first actuator.

5. The dual-input mechanical bypass linkage apparatus of claim 3, wherein the second actuator is an electromechanical motor.

6. The dual-input mechanical bypass linkage apparatus of claim 3, wherein the first actuator is a collective lever, a cyclic stick, or a foot pedal of a helicopter.

7. The dual-input mechanical bypass linkage apparatus of claim 6, wherein the output link is coupled to a main rotor or a tail rotor of the helicopter.

8. The dual-input mechanical bypass linkage apparatus of claim 1, wherein the first input force is transferable from the first actuator to the first input link to move the first input link, from the first input link to the first extension link to move the first extension link, from the first extension link to the secondary link to move the secondary link, from the secondary link to the second extension link to move the second extension link, and from the second extension link to the output link to move the output link.

9. The dual-input mechanical bypass linkage apparatus of claim 8, wherein the second input force is transferable from the second actuator to the second input link to move the second input link, from the second input link to the primary link to move the primary link, from the primary link to the second extension link to move the second extension link, and from the second extension link to the output link to move the output link.

10. The dual-input mechanical bypass linkage apparatus of claim 9, wherein the second input force is to boost the first input force.

11. The dual-input mechanical bypass linkage apparatus of claim 9, wherein the second input force is to be balanced with the first input force.

12. The dual-input mechanical bypass linkage apparatus of claim 9, wherein the first input link, the first extension link, the secondary link, and the second extension link are to provide a mechanical bypass to move the output link when the second actuator fails.

13. The dual-input mechanical bypass linkage apparatus if claim 9, wherein the first input link, the first extension link, the secondary link, and the second extension link are to provide a mechanical bypass to move the output link when the second input link is locked.

14. The dual-input mechanical bypass linkage apparatus of claim 8, wherein the second actuator is configured to generate a stabilization input force without the first input force being generated by the first actuator, the stabilization input force being transferable from the second actuator to the second input link, from the second input link to the primary link, from the primary link to the second extension link, and from the second extension link to the output link.

15. A dual-input mechanical bypass linkage apparatus, comprising:
    a first actuator configured to generate a first input force;
    a second actuator configured to generate a second input force;
    a primary link movable in response to the second input force, the primary link having a first end, a second end located opposite the first end, and a midpoint located between the first end and the second end;
    a secondary link movable in response to the first input force, the secondary link having a first end and a second end located opposite the first end, the secondary link spaced apart from the primary link;
    a first extension link having a first end, a second end located opposite the first end, and a midpoint located between the first end and the second end, the first extension link spaced apart from the first actuator and extending between the primary link and the secondary link, the first end of the first extension link rotatably coupled to the first end of the primary link, the second end of the first extension link rotatably coupled to the first end of the secondary link, the midpoint of the first extension link rotatably coupled to a first input link, the first input link coupled to and extending between the first actuator and the first extension link, the midpoint of the primary link rotatably coupled to a second input link, the second input link coupled to and extending between the second actuator and the primary link; and a second extension link having a first end, a second end located opposite the first end, and a midpoint located between the first end and the second end, the second extension link spaced apart from the first extension link and extending between the primary link and the secondary link, the first end of the second extension link rotatably coupled to the second end of the primary link, the second end of the second extension link rotatably coupled to the second end of the secondary link, the midpoint of the second extension link rotatably coupled to an output link.

16. The dual-input mechanical bypass linkage apparatus of claim 15, wherein the first input force is transferable from the first actuator to the first input link to move the first input link, from the first input link to the first extension link to move the first extension link, from the first extension link to the secondary link to move the secondary link, from the secondary link to the second extension link to move the second extension link, and from the second extension link to the output link to move the output link.

17. The dual-input mechanical bypass linkage apparatus of claim 16, wherein the second input force is transferable from the second actuator to the second input link to move the second input link, from the second input link to the primary link to move the primary link, from the primary link to the second extension link to move the second extension link, and from the second extension link to the output link to move the output link.

18. The dual-input mechanical bypass linkage apparatus of claim 16, wherein the first input link, the first extension link, the secondary link, and the second extension link are to provide a mechanical bypass to move the output link when the second input link is locked.

19. A method for moving an output link of a dual-input mechanical bypass linkage apparatus, the method comprising:

receiving a first input force at a first input link of the dual-input mechanical bypass linkage apparatus, the first input force generated by a first actuator coupled to the first input link;

transferring the first input force from the first input link to a first extension link of the dual-input mechanical bypass linkage apparatus spaced apart from the first actuator to move the first extension link, from the first extension link to a secondary link of the dual-input mechanical bypass linkage apparatus to move the secondary link, from the secondary link to a second extension link of the dual-input mechanical bypass linkage apparatus to move the secondary link, and from the second extension link to the output link to move the output link, wherein the first input link is coupled to and extends between the first actuator and the first extension link, the first extension link is coupled to the secondary link, the secondary link is coupled to the second extension link, the second extension link is coupled to the output link, and the second extension link is spaced apart from the first extension link; and when a second input link of the dual-input mechanical bypass linkage apparatus is not locked:

receiving a second input force at the second input link, the second input force generated by a second actuator coupled to the second input link; and transferring the second input force from the second input link to a primary link of the dual-input mechanical bypass linkage apparatus to move the primary link, from the primary link to the second extension link to move the second extension link, and from the second extension link to the output link to move the output link, wherein the second input link is coupled to and extends between the second actuator and the primary link, the primary link is coupled to the second extension link, and the primary link is spaced apart from the secondary link.

20. The method of claim 19, wherein the first actuator is manually powered, the second actuator is electromechanically powered, and the second input force boosts the first input force.

* * * * *

UNITED STATES PATENT AND TRADEMARK OFFICE
CERTIFICATE OF CORRECTION

PATENT NO. : 10,507,910 B2
APPLICATION NO. : 15/441427
DATED : December 17, 2019
INVENTOR(S) : Donald Guzman

Page 1 of 1

It is certified that error appears in the above-identified patent and that said Letters Patent is hereby corrected as shown below:

In the Claims

Column 14, Claim 13, Line 29, replace "if" with --of--

Signed and Sealed this
Tenth Day of March, 2020

Andrei Iancu
*Director of the United States Patent and Trademark Office*